United States Patent [19]
Fennel et al.

[11] Patent Number: 5,458,404
[45] Date of Patent: Oct. 17, 1995

[54] REDUNDANT WHEEL SENSOR SIGNAL PROCESSING IN BOTH CONTROLLER AND MONITORING CIRCUITS

[75] Inventors: Helmut Fennel, Bad Soden; Hans-Wilhelm Bleckmann, Bad Nauheim, both of Germany

[73] Assignee: ITT Automotive Europe GmbH, Germany

[21] Appl. No.: 232,206

[22] PCT Filed: Oct. 21, 1991

[86] PCT No.: PCT/EP92/02410

§ 371 Date: Apr. 29, 1994

§ 102(e) Date: Apr. 29, 1994

[87] PCT Pub. No.: WO93/09986

PCT Pub. Date: May 27, 1993

[30] Foreign Application Priority Data

Nov. 12, 1991 [DE] Germany .......................... 41 37 124.0

[51] Int. Cl.⁶ .................................................... B60T 8/88
[52] U.S. Cl. ............................................ 303/176; 303/122
[58] Field of Search ................................. 303/92, 95, 103, 303/104, 105, 110, 111; 364/426.01, 426.02, 426.03

[56] References Cited

U.S. PATENT DOCUMENTS

| | | | |
|---|---|---|---|
| 4,546,437 | 10/1985 | Bleckmann et al. | 303/92 X |
| 4,773,072 | 9/1988 | Fennel | 303/92 X |
| 5,016,249 | 5/1991 | Hurst et al. | 371/14 |
| 5,136,511 | 8/1992 | Pannbacker | 364/426.02 |

FOREIGN PATENT DOCUMENTS

| | | |
|---|---|---|
| 0322141 | 6/1989 | European Pat. Off. . |
| 0379669 | 8/1990 | European Pat. Off. . |
| 2928981 | 2/1981 | Germany . |
| 3126102 | 1/1983 | Germany . |
| 3234637 | 3/1984 | Germany . |
| 3518105 | 11/1986 | Germany . |
| 2715717 | 12/1986 | United Kingdom . |

*Primary Examiner*—Josie A. Ballato
*Attorney, Agent, or Firm*—Ratner & Prestia

[57] ABSTRACT

A circuit configuration for a brake system with anti-lock control and/or traction slip control composed of circuits for conditioning wheel sensor signals, controller circuits for analyzing and processing the conditioned sensor signals and for generating braking pressure control signals, monitoring circuits which process the sensor signals irrespective of the controller circuits, and circuits for exchanging and comparing signals of the controller circuits with corresponding signals of the monitoring circuits. The monitoring circuits have a simpler structure than the controller circuits. The control philosophy is reproduced in the monitoring circuits. In particular, the control phases are determined by the reproduction on the basis of the same control criteria and control parameters which the controller circuits use. The signals of the reproduction circuits are united with the valve-excitation signals in correlation circuits for the detection of errors.

13 Claims, 3 Drawing Sheets

REDUNDANT WHEEL SENSOR SIGNAL PROCESSING IN BOTH CONTROLLER AND MONITORING CIRCUITS

BACKGROUND OF THE INVENTION

The present invention relates to a circuit configuration which is intended for a brake system with anti-lock control and/or traction slip control and which comprises (a) circuits for conditioning sensor signals representative of the rotational behavior of the individual vehicle wheels, (b) controller circuits for analyzing and processing the conditioned sensor signals and for generating braking pressure control signals that drive solenoid valves inserted into the pressure fluid conduits of the brake system, (c) monitoring circuits to which the conditioned sensor signals can be supplied and which, in case of a malfunction, de-activate or disconnect the control in part or completely, and (d) circuits for exchanging and comparing signals of the controller circuits with corresponding signals of the monitoring circuits.

A circuit configuration for controlling and monitoring an anti-lock brake system is disclosed in patent specification DE 32 34 637 C2. According to this patent specification, the conditioned wheel sensor signals are analyzed and processed in parallel in two completely identical microcontrollers which operate pursuant to the same program and to which the conditioned sensor signals are supplied. The output signals of the two microcontrollers and internal signals or intermediate results are exchanged and compared. Since the two controllers are supplied with the same sensor signals, the external and the internal signals must be coincident when the system is intact. This criterion is assessed for monitoring the system. Once a non-coincidence is detected, this leads to a partial or complete de-activation of the anti-lock control.

The prior art system described above requires two high-quality microcontrollers, although one single microcontroller would be sufficient for generating the actual braking pressure control signals. Consequently, the expenditure in microcontrollers is doubled according to this patent for safety reasons.

An anti-lock brake system, disclosed in published patent application DE 29 28 981 A1, comprises at least one control microcomputer and another microcomputer for testing and monitoring the control channels. By means of this test microcomputer, test signals are generated and delivered into the control channels through the input circuits associated with the control microcomputers. Control operations are simulated by the test signals, and the reaction of the control computer to these simulated signals is sensed. The precondition for the test operations is that no braking with anti-lock control takes place and that the vehicle speed is in excess of a predetermined limit value. Further, for the error detection during braking with anti-lock control, the test microcomputer serves to check the duration of some control signals and of some valve-excitation signals for preserving limit values. Finally, all automatic checking of the microcomputer is provided.

In spite of the relatively great expenditure, naturally, a like arrangement permits only detection of specific errors or types of errors because, in contrast to the circuit configuration described above, redundant signal processing in conjunction with a comparison of the redundantly processed signals for coincidence is not performed.

SUMMARY OF THE INVENTION

Therefore, it is an object of the present invention to develop an ABS-system or a TSC-system which has the variety and safety of the error detection of a system that is based on redundant signal processing and the de-activation of the control in the event of non-coincidence of the redundantly processed signals, and which, nevertheless, can be manufactured with comparatively little effort.

This object can be achieved by a circuit configuration according to the present invention, the special features of which reside in that the monitoring circuits are composed substantially of (a) circuits for the speed conditioning, (b) circuits for generating signals derived from the wheel speed, such as deceleration signals and acceleration signals, jerk signals, reference signals, etc., (c) circuits for the simplified reproduction of the control algorithms or control philosophy, respectively, in particular, for the determination of the control phases, which result when the derived signals are analyzed according to the algorithms of the controller circuits, and (d) circuits for the correlation of the output signals of the control-philosophy reproduction circuits with the braking pressure control signals.

Thus, according to the present invention, the conditioned sensor signals are processed redundantly in parallel, even though irrespective of each other, in a controller circuit and in a monitoring circuit such that data transfer and comparison of the signals processed in the controller circuits and the monitoring circuits are possible. The data processing in the monitoring circuits, in comparison to the controller circuits, can be simplified considerably without the safety of error detection suffering. For instance, it is sufficient to arrange for the speed conditioning in the monitoring circuits such that, in a comparison with the corresponding signals of the controller circuits, it is determined whether the conditioned speed signals lie within predetermined tolerance ranges. Similarly, this applies to the generation and the comparison of the derived signals, namely the acceleration signals, reference signals, etc. What is essential to the present invention is the "reproduction" of the control philosophy, which is utilized for the processing of the derived signals in the monitoring circuits. This reproduction of the control philosophy or, respectively, of the control algorithms, by means of which the braking pressure control signals are precisely determined in the controller circuits by involving great expenditure in calculating in consideration of a great number of input data, filter criteria etc., has a comparatively simple structure. In particular, the control phases are determined by the circuits representing this reproduction by analyzing the derived signals according to principally the same control parameters which also apply for the control philosophy for the controller circuits. Errors in the system, namely in the controller circuits and/or in the monitoring circuits, can be recognized by virtue of correlation of the output signals of these reproduction circuits with the actual braking pressure control signals, with the resolution of these signals within the control cycles being of no importance. It becomes possible by the described simplification of the monitoring circuits to employ a high-performance microcontroller, e.g. a 16-bit microcontroller, for the control, but to employ a much more inexpensive 8-bit microcontroller for the monitoring.

According to one embodiment of the present invention, the circuits for exchanging and comparing signals of the control microcontroller with corresponding signals of the monitoring microcontroller and the circuits for the correlation of the valve-excitation signals with the signals of the reproduction circuits are provided as integral components of the control microcontroller and the monitoring microcontroller.

According to another embodiment of the present invention, the control microcontroller and/or the monitoring microcontroller are furnished with additional circuits for checking and comparing the speed signals, the derived signals, the control phases, the intervals of valve excitation etc., pursuant to plausibility criteria.

According to yet another embodiment of the present invention, the monitoring circuits are arranged to continue the analyzing and processing of the data on the basis of those data which have been taken from the controller circuits and have been checked for the preservation of tolerances by comparison with the corresponding data of the monitoring circuits.

Further features, advantages and possibilities of application of the present invention can be gathered from the following description with reference to the accompanying drawings.

DETAILED DESCRIPTION OF THE INVENTION

Figure 1:
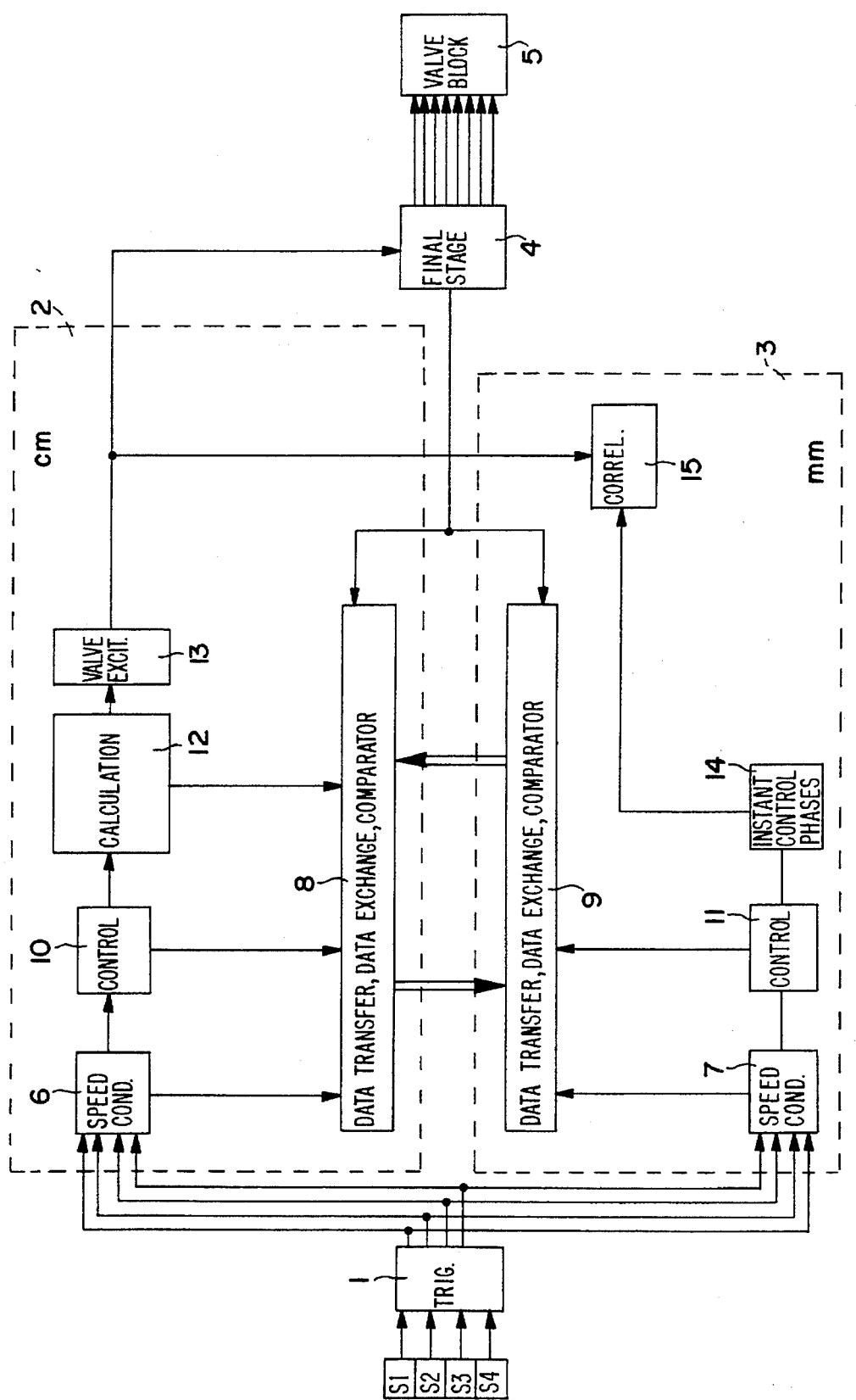
FIG. 1 is a block diagram of the most important component parts of a circuit configuration according to the present invention.

According to FIG. 1, the circuit configuration according to the present invention is composed of a trigger 1, namely a circuit configuration for the conditioning of sensor signals, a control microcontroller CM 2, a monitoring microcontroller MM 3 and a final stage 4, to the outputs of which electrically controllable hydraulic valves 5 are connected. Reference numeral 5 represents a valve block which can be composed of an anti-lock system (ABS) with a control consisting of four inlet valves and four outlet valves individually associated with each wheel.

The signals of four wheel sensors S1 to S4 are supplied to the inputs of the trigger 1. In general, such wheel sensors furnish an alternating signal whose frequency is proportional to the wheel speed. A corresponding square-wave signal or a pulse train is provided at the outputs of the trigger 1.

Consequently, controller circuits and monitoring circuits are realized in the present embodiment by the microcontrollers CM 2 and MM 3, respectively. To generate the braking pressure control signals and the valve-actuating signals, respectively, a relatively sophisticated high-performance microcontroller CM 2, namely a 16-bit microcontroller, is employed. On the other hand, an 8-bit microcontroller MM 3 is sufficient for the independent data processing in the monitoring microcontroller 3 serving for the error detection, although the conditioned sensor signals are processed in both microcontrollers in a principally like fashion and such that the data of the individual processing stages can be exchanged and, with a view to detecting errors, can be compared for coincidence. In spite of utilizing different microcontrollers, a largely redundant processing of the conditioned sensor signals is performed in the controller circuits and in the monitoring circuits. The simplification and the reduced expenditure in comparison to conventional systems with two like microcontrollers is accomplished by limiting to signals essential for the control, by limiting to "tolerance ranges" within which the compared data have to lie in a fail-free system, and by defining a "reproduction" of the control philosophy. Principally, this reproduction works according to the same criteria and control parameters, e.g. slip, acceleration, and deceleration etc., and according to the same algorithms as does the actual control philosophy.

The reproduction of the control philosophy is limited to ascertaining or detecting the control phases in an embodiment of the present invention. It can be gathered with great accuracy by way of correlation of the control phases determined in the monitoring microcontroller with the valve-excitation signals or, respectively, from the switch positions of the individual valves, whether the system is fail-free, or whether there is an imminent malfunction. In the event of reproduction of the control philosophy, the resolution of the control cycles, the precise calculating of the pulse times within the control cycles, and the exact dimensioning of the pressure increase and the pressure decrease etc., is dispensed with. Also, other sophisticated calculating operations, which serve in the control circuits for filtering the signals, for linearizing the pressure increase and pressure decrease, and for forming a pressure pattern, etc., are not required to monitor the function. These circuits or calculating steps, which necessitate a very considerable portion of the entire calculating effort in practical operations, can be dispensed with without the safety of the error detection suffering.

According to FIG. 1, the conditioned sensor signals in the two controllers 2 and 3 first are processed in parallel in speed-conditioning circuits 6 and 7, respectively. Signals or data, respectively, are obtained which represent the velocities of the individual wheels. It is determined by virtue of the data transfer circuits, data exchange circuits and comparator circuits 8 and 9, whether the redundantly obtained wheel speed signals are coincident. In a preferred embodiment of the present invention, tolerance ranges are taken as a basis for the comparator; that means, a proper function is taken for granted when the corresponding speed data lie within a predetermined tolerance range. If this condition is fulfilled, according to another embodiment of the present invention, the signal processing and data processing, respectively, can be continued in the monitoring microcontroller on the basis of those data which have been obtained in the control microcontroller 2 and have reached the monitoring microcontroller 3 by data exchange. This is an advantage if, for instance, the speed conditioning in the control microcontroller 2 is performed with greater accuracy or higher resolution than in the monitoring microcontroller 3.

Following the speed conditioning is the determination of the derived signals required for the control, in particular the acceleration signals and deceleration signals, the vehicle reference speed, if so required, the jerk signals, etc. in both microcontrollers 2, 3 in circuits 10, 11. The coincidence of these derived signals is monitored by exchanging and comparing the data via the circuits 8 and 9, and again tolerance ranges can be made the basis therefor. Further processing of the data in the monitoring microcontroller 3, on the basis of the transferred data, is also possible.

On the basis of these derived signals, the intervention in the braking pressure variation and, respectively, the brake activation required for the anti-lock control or traction slip control is now determined according to various control algorithms, which are included under the general term "control philosophy". The expenditure in calculating operations involved at this point, in consideration of a great number of limiting quantities, is of decisive importance for the quality of the control system. The results of these calculating operations, which are performed in a circuit 12, finally lead to the rating of the intervals of excitation of the individual braking pressure control valves, namely the known braking pressure inlet valves and outlet valves. The intervals of valve excitation are defined in the circuit 13 of the control microcontroller 2. Finally, the solenoid valves 5 or braking pressure control valves are actuated by virtue of the output signals of this circuit 13 via the final stage 4.

In lieu of the sophisticated calculation of the control philosophy in the block 12 of the control microcontroller 2, a "reproduction" of the control philosophy is effected in a circuit 14 in the monitoring microcontroller 3. The circuit 14 determines the instantaneous control phases from the derived signals which were defined in the circuit 11. In an embodiment of an inventive circuit configuration for an anti-lock system, six different phases are defined, of which one phase (phase 0) characterizes the condition outside the control, a second control phase (phase 1) characterizes the entry of the wheel into an unstable range, another phase (phase 2) characterizes the unstable condition of a wheel, another phase (phase 3) characterizes the regaining of stability, another control phase (phase 4) characterizes the transition of the wheel from the unstable into the stable range of the control, and, finally, still another control phase (phase 5) characterizes the time range in which the wheel speed is above the so-called vehicle reference speed. Limiting to fewer control phases or a more exact classification is quite possible. In practice, error functions can be recognized with great reliability by correlation of the control phases determined with the aid of the control philosophy reproduction 14 with the actual valve-excitation signals supplied by the circuit 13 of the control microcontroller 2. An exact resolution of the valve-excitation signals, e.g. length and number of the individual pressure-increase pulses during a specific control phase, etc. is not necessary for the error detection. This correlation of the control phases, with the valve-excitation signals, is performed in a circuit 15 of the monitoring microcontroller 3.

The reaction of the final stage 4 to the valve-excitation signals is fed back to the data transfer and comparator circuits 8, 9 of the two microcontrollers 2, 3 in the embodiment according to FIG. 1. This way, the final stage 4 is included in the monitoring.

Figure 2:
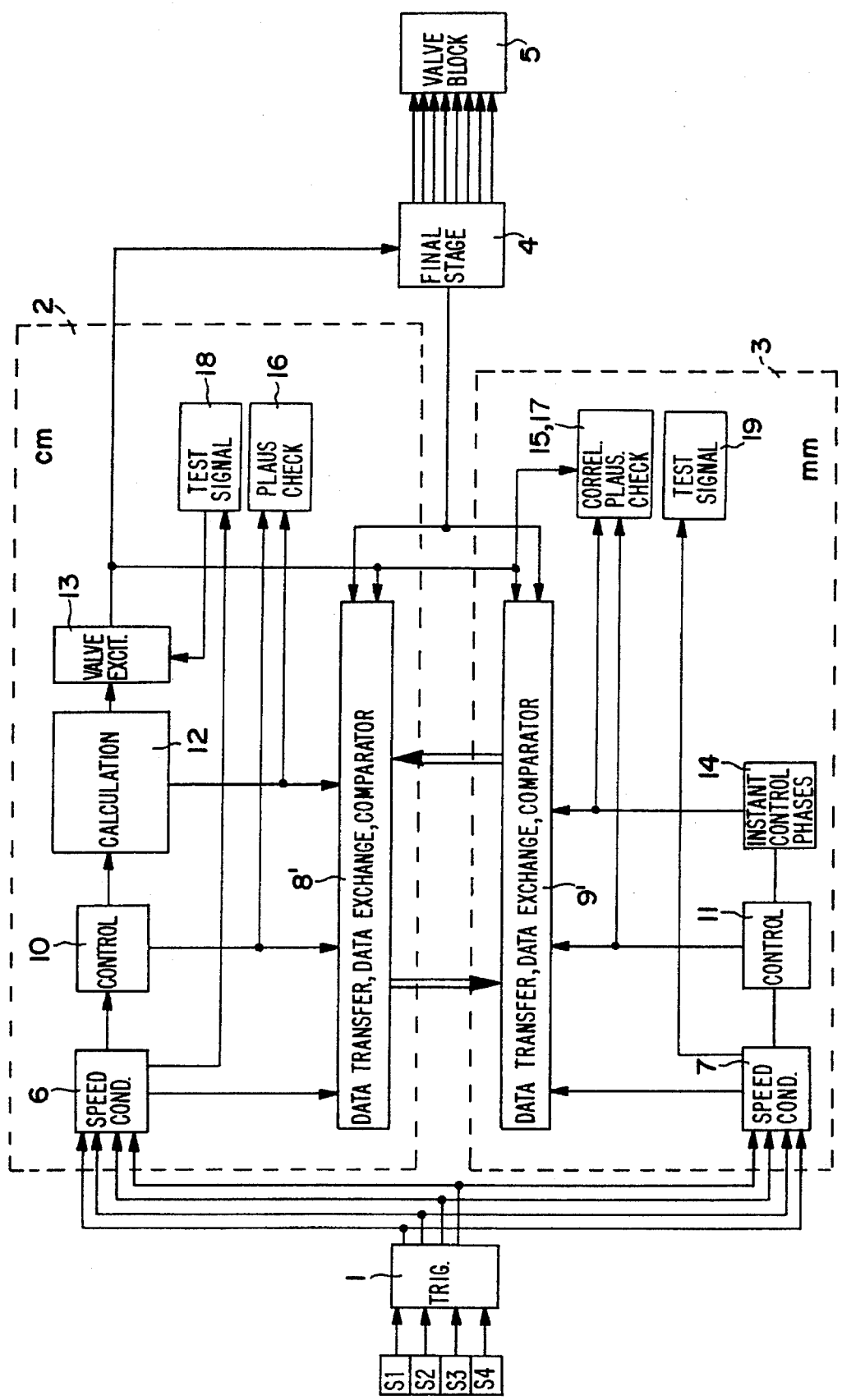
FIG. 2 is an extension of the circuit configuration according to FIG. 1.

The circuit configuration according to FIG. 2 only differs from the embodiment of FIG. 1 by some additional circuits and monitoring functions. Both in the control microcontroller 2 and in the monitoring microcontroller 3, the derived signals, irrespective of one another, are checked for "plausibility" with regard to each other and/or with regard to the data found by virtue of the control philosophy block 12 or, respectively, with the aid of the control philosophy reproduction 14. Once the signal combination is found contradictory or physically not possible, this indicates an error and a partial or temporarily limited de-activation of the control or a complete disconnection is initiated thereby in a fashion not shown. In FIG. 2, the circuits for the plausibility check are referred to by reference numeral 16 in the control microcontroller and by reference numeral 17 in the monitoring microcontroller.

Further, a test signal generating circuit 18 is provided in the embodiment according to FIG. 2, which produces valve test signals by means of the valve-excitation circuit 13 which are so short that they do not cause a valve reaction, but permit detection of errors in the signal path. The test signal generator 18 is integrated in the control microcontroller CM 2 in the embodiment according to FIG. 2.

The circuit 18 and a corresponding circuit 19, which is integrated in the monitoring microcontroller 3, are supplied with output signals of the speed-conditioning circuits 6 and 7, respectively. Among others, these circuits 18, 19 serve to redundantly monitor the input circuits, in particular the trigger 1 and indirectly the wheel sensors S1 to S4. This is because a short-circuit or a line interruption between the wheel sensors and the trigger 1 is signalled to the speed-conditioning circuits 6 and 7, respectively, in the form of a low-frequency vibration or a permanent signal. Such errors and other errors will then be detected by means of the circuits 18, 19, and result in the de-activation or disconnection of the control.

The output signals of the valve-excitation circuit 13, in addition, are supplied to the data transfer and comparator circuits 8', 9' in the circuit configuration according to FIG. 2. Consequently, the valve-actuating signals fed back through the final stage 4 are compared with the valve-excitation signals of the circuit 13 for coincidence in these two circuits 8', 9'. In addition, the valve-excitation signals and the valve-actuating signals are exchanged through the circuits 8', 9'. In the event of non-coincidence of the signals, the de-activation or disconnection of the control is also initiated directly by these circuits.

Figure 3:
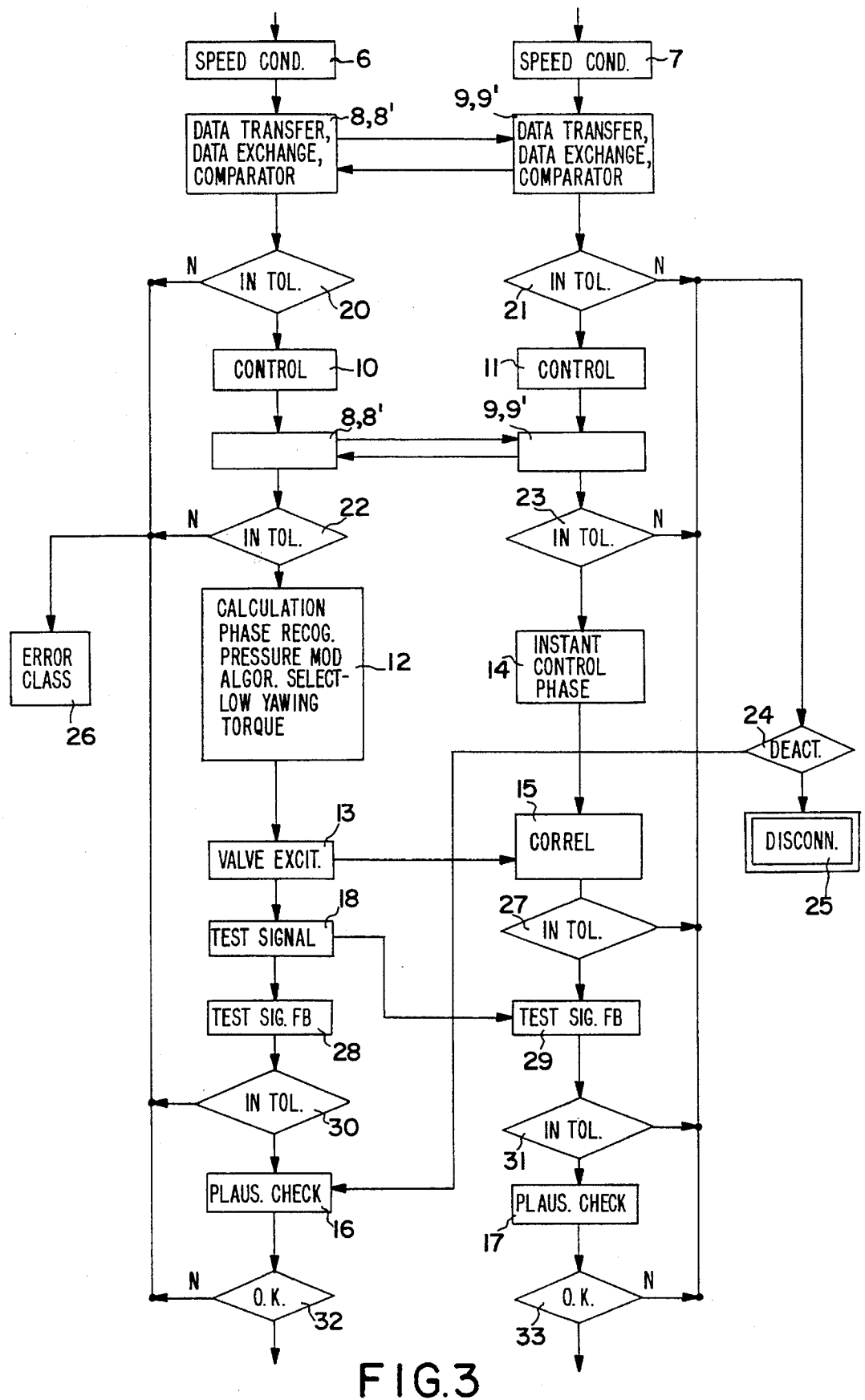
FIG. 3 is a simplified flow chart for explaining the mode of function of a circuit configuration according to the present invention.

The mode of operation of a circuit configuration according to the present invention, corresponding to the embodiment according to FIG. 2, is explained with the flow chart illustrated in FIG. 3. To the extent possible, the same reference numerals used in FIGS. 1 and 2 are used in FIG. 3.

In the control microcontroller CM 2 and the monitoring microcontroller MM 3, the wheel speed data obtained in the circuits or function blocks 6, 7, irrespective of one another, are exchanged via the data transfer and comparator circuits 8, 9; 8', 9' and are compared for coincidence. If the data are within the tolerance ranges, the derived signals (slip, acceleration and deceleration, etc.) are formed, irrespective of one another, in the circuits 10 and 11. Succeeding the data exchange through the circuits 8, 9 and 8', 9', respectively, is the calculation in the control philosophy block 12 or, respectively, in the reproduction circuit 14. As suggested in FIG. 3, the "control philosophy" comprises, among others, the phase recognition, the different pressure modulation algorithms, the application of selection criteria such as select-low, and a yawing torque limitation (GMB). The reproduction of the control philosophy 14 can be limited to the recognition of control phases.

The branching points 20, 21, 22, 23 in the data flow result in the de-activation 24 or even disconnection of the entire anti-lock control or traction slip control, if the exchanged signals are not coincident or, respectively, lie outside the predetermined tolerance ranges. A function block 26 indicates that on the occurrence of non-coincidence, determined by the branching points 20 or 21, or in the event of exceeding of the tolerance ranges, the error is classified before de-activation or disconnection is effected.

After the data processing in the block 12, the correlation of the intervals of valve excitation with the output signals of the control philosophy reproduction 14 and, respectively, with the control phases follows in the block 12. In this instance, too, it is sufficient that the compared data lie within specific tolerance ranges. If this is not the case, again a partial de-activation 24 or the disconnection 25 is initiated by a decision stage 27.

The production of test signals or test pulses by way of a circuit 18, the assessment of the feedback of these test pulses, symbolized by the function blocks 28 and 29, the reaction to an erroneous feedback which, via the branching points 30 and 31, leads to the de-activation or disconnection of the control, as well as finally the application of plausibility criteria with the aid of the circuits 16 and 17 according to FIG. 2 are likewise illustrated in the flow chart according to FIG. 3. Once the plausibility criteria are not fulfilled, this will again result in de-activation or disconnection of the control because of the signal branching points 32, 33.

The program run illustrated takes place in a loop. After the illustrated functions are completed, the program is started anew. It will be understood that only the most important functions have been illustrated in the flow chart according to FIG. 3. Further functions can be added depending on the special type of application.

We claim:

1. A circuit configuration for an automotive vehicle having a plurality of wheels and a brake system having an anti-lock control and/or traction slip control which include pressure fluid conduits leading to a plurality of brakes associated with the wheels, said circuit configuration comprising:

solenoid valves in the pressure fluid conduits of the brake system;

sensing means for developing sensor signals representative of the individual rotational behavior of the wheels of the vehicle;

controller circuit means for analyzing and processing said sensor signals and for generating braking pressure control signals which control said solenoid valves, said controller circuit means including:
 (a) circuit means responsive to said sensor signals for developing first conditioned sensor signals,
 (b) circuit means responsive to said first conditioned sensor signals for generating first control signals representative of selected parameters by which anti-lock control and/or the traction slip control is controlled, and
 (c) circuit means for:
  (1) comparing said first control signals against control criteria to determine the need for anti-lock control and/or traction slip control, and
  (2) generating braking pressure control signals upon a determination of the need for anti-lock control and/or traction slip control; and monitoring circuit means responsive to said sensor signals for detecting errors in anti-lock control and/or traction slip control and for deactivating, at least partially, at least one of anti-lock control and traction slip control upon detection of an error, said monitoring circuit means including:
 (a) circuit means for developing second conditioned sensor signals,
 (b) circuit means responsive to said second conditioned sensor signals for generating second control signals representative of selected parameters by which anti-lock control and/or the traction slip control is controlled,
 (c) circuit means for comparing said second control signals against reproductions of selected control criteria to determine the need for anti-lock control and/or traction slip control, and
 (d) circuit means for correlating the comparison of said second control signals against said reproductions of selected control criteria with said braking pressure control signals;

said controller circuit means and said monitoring circuit means each including means for selectively exchanging and comparing corresponding signals of said controller circuit means and said monitoring circuit means.

2. A circuit configuration as claimed in claim 1 wherein said controller circuit means are part of a controller microcontroller and the monitoring circuit means are part of a monitoring microcontroller and said monitoring microcontroller has a simplified structure in comparison with said control microcontroller.

3. A circuit configuration as claimed in claim 2 said controller microcontroller is a 16-bit high-performance microcontroller and said monitoring microcontroller is an 8-bit microcontroller.

4. A circuit configuration as claimed in claim 1 wherein the comparison of signals of the controller circuit means with the corresponding signals of the monitoring circuit means is based on keeping within tolerance ranges.

5. A circuit configuration as claimed in claim 4 wherein said controller microcontroller and said monitoring microcontroller check and compare speed signals, derived signals, control phases, and intervals of valve excitation pursuant to plausibility criteria.

6. A circuit configuration as claimed in claim 5 wherein analysis and processing is continued in said monitoring circuit means on the basis of data taken from said controller circuit means checked for complying with the tolerances by comparison with the corresponding data of said monitoring circuits means.

7. A circuit configuration for an automotive vehicle having a plurality of wheels and a brake system, having an anti-lock control and/or traction slip control and including pressure fluid conduits leading to a plurality of brakes associated with the wheels and solenoid valves in the pressure fluid conduits of the brake system, said circuit configuration comprising:

controller circuit means for analyzing and processing sensor signals representative of the individual rotational behavior of the wheels of the vehicle and for generating braking pressure control signals which control said solenoid valves, said controller circuit means including:
 (a) circuit means responsive to said sensor signals for developing first controller circuit-conditioned data,
 (b) circuit means responsive to said first controller circuit-conditioned data for generating second controller circuit-conditioned data representative of selected parameters by which anti-lock control and/or the traction slip control is controlled, and
 (c) circuit means for:
  (1) comparing said second controller circuit-conditioned data against control criteria to determine the need for anti-lock control and/or traction slip control, and
  (2) generating braking pressure control signals upon a determination of the need for anti-lock control and/or traction slip control; and monitoring circuit means responsive to said sensor signals for detecting errors in anti-lock control and/or traction slip control and for deactivating, at least partially, at least one of anti-lock control and traction slip control upon detection of an error, said monitoring circuit means including:
 (a) circuit means for developing first monitoring circuit-conditioned data,
 (b) circuit means responsive to said first monitoring circuit-conditioned data for generating second monitoring circuit-conditioned data representative of selected parameters by which anti-lock control and/ or the traction slip control is controlled, (c) circuit means for comparing said second monitoring circuit-conditioned data against reproductions of selected control criteria to determine the need for anti-lock control and/or traction slip control, and (d) circuit means for correlating the comparison of said second monitoring circuit-conditioned data against said reproductions of selected control criteria with said braking pressure control signals;

said controller circuit means and said monitoring circuit means each including means for selectively exchanging and comparing corresponding data of said controller circuit means and said monitoring circuit means.

8. A circuit configuration as claimed in claim 7 wherein said controller circuit means are part of a controller microcontroller and the monitoring circuit means are part of a monitoring microcontroller and said monitoring microcontroller has a simplified structure in comparison with said control microcontroller.

9. A circuit configuration as claimed in claim 8 wherein said controller microcontroller is a 16-bit high-performance microcontroller and said monitoring microcontroller is an 8-bit microcontroller.

10. A circuit configuration as claimed in claim 8 wherein:

said means for selectively exchanging and comparing corresponding data of said controller circuit means and said monitoring circuit means; and said means for correlating the comparison of said second monitoring circuit-conditioned data against said reproductions of selected control criteria with said braking pressure control signals, are integral components of the controller microcontroller and the monitoring microcontroller.

11. A circuit configuration as claimed in claim 7 wherein the comparison of data of the controller circuit means with the corresponding data of the monitoring circuit means is based on keeping within tolerance ranges.

12. A circuit configuration as claimed in claim 11 wherein said controller microcontroller and said monitoring microcontroller check and compare speed signals, derived signals, control phases, and intervals of valve excitation pursuant to plausibility criteria.

13. A circuit configuration as claimed in claim 12 wherein analysis and processing is continued in said monitoring circuit means on the basis of data taken from said controller circuit means checked for complying with the tolerances by comparison with the corresponding data of said monitoring circuits means.

* * * * *

UNITED STATES PATENT AND TRADEMARK OFFICE
CERTIFICATE OF CORRECTION

PATENT NO. : 5,458,404
DATED : October 17, 1995
INVENTOR(S) : Fennel et al.

It is certified that error appears in the above-indentified patent and that said Letters Patent is hereby corrected as shown below:

On the title page, item [22], delete "Oct. 21, 1991" and substitute therefor --Oct. 21, 1992--;

Item [56] References Cited, last reference under FOREIGN PATENT DOCUMENTS, delete "2715717" and substitute therefor --2175717--.

Signed and Sealed this

Nineteenth Day of March, 1996

Attest:

BRUCE LEHMAN

Attesting Officer                Commissioner of Patents and Trademarks